(12) United States Patent
Houlberg (10) Patent No.: US 7,160,640 B2
(45) Date of Patent: Jan. 9, 2007

(54) FUEL CELL STACK WITH PASSIVE END CELL HEATER

(75) Inventor: Steven E. Houlberg, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 10/346,200

(22) Filed: Jan. 15, 2003

(65) Prior Publication Data

US 2004/0137295 A1    Jul. 15, 2004

(51) Int. Cl.
*H01M 8/12*    (2006.01)
*B60K 1/00*    (2006.01)

(52) U.S. Cl. .......................... 429/26; 429/23; 429/24; 180/65.3

(58) Field of Classification Search .................. 429/26, 429/24, 20, 12, 120, 23, 21, 62; 180/65.3
See application file for complete search history.

(56) References Cited

U.S. PATENT DOCUMENTS 4,781,995 A * 11/1988 Giner .......................... 429/13
5,789,092 A * 8/1998 Spiers et al. ................... 429/24
6,409,976 B1 * 6/2002 Poschmann et al. ........ 422/199
2001/0036568 A1   11/2001 Farkash et al. ............... 429/26
2002/0187087 A1 * 12/2002 Goebel ....................... 422/198

FOREIGN PATENT DOCUMENTS

| JP | 60-172175 | * | 9/1985 |
| JP | 5-47397 | | 2/1993 |
| JP | 8-130028 | | 5/1996 |
| JP | 8-167424 | | 6/1996 |
| JP | 9-45353 | | 2/1997 |
| JP | 9-92322 | | 4/1997 |
| JP | 9-289026 | | 11/1997 |
| JP | 10-32016 | | 2/1998 |
| JP | 10-308229 | | 11/1998 |
| JP | 2001-68139 | | 3/2001 |

* cited by examiner

*Primary Examiner*—Raymond Alejandro
(74) *Attorney, Agent, or Firm*—Seed IP Law Group PLLC (57) ABSTRACT

A fuel cell system comprising a passive end cell heater for heating an end cell or cells within a fuel cell stack is disclosed. The fuel cell system comprises a fuel cell stack and a resistive heatable element connected in parallel to the fuel cell stack, wherein the resistive heatable element is adapted to heat an end cell of the fuel cell stack. A method for heating an end cell in a fuel cell stack is also disclosed.

13 Claims, 10 Drawing Sheets

FUEL CELL STACK WITH PASSIVE END CELL HEATER

TECHNICAL FIELD

The present invention generally relates to heating an end cell of a fuel cell stack and systems and methods related thereto.

BACKGROUND OF THE INVENTION

A fuel cell converts chemical energy to electrical energy by promoting a chemical reaction between two reactants; namely, a fuel (such as hydrogen) and an oxidant (such as oxygen in the air). One common type of fuel cell is the solid polymer electrolyte fuel cell which typically includes a cathode flow field plate, an anode flow field plate and a membrane electrode assembly (MEA) disposed between the cathode flow field plate and the anode flow field plate. The MEA includes a solid polymer electrolyte, typically a proton exchange membrane (PEM), between a first or anode catalyst and a second or cathode catalyst. Each flow field plate has an inlet, an outlet and open-faced channels connecting the inlet to the outlet and for distributing the reactants to, and removing products from, the MEA.

The anode catalyst interacts with the anode reactant to catalyze the conversion of the anode reactant to reaction intermediates. The reaction intermediates include cations (e.g., protons) and electrons. When the anode reactant is hydrogen gas, the anode catalyst breaks the hydrogen gas into protons and electrons ($H_2 \rightarrow 2H^+ + 2e^-$). The electrolyte provides a barrier to the flow of the electrons from the anode-side of the PEM to the cathode-side, while permitting the cations to pass through to the cathode-side of the PEM. Instead, the electrons flow from the anode-side of the PEM to the cathode-side of the PEM through an external load (thus providing useable electrical current).

At the cathode-side of the PEM, the cathode catalyst interacts with the cathode reactant and the reaction intermediates to catalyze the conversion of the cathode reactant to the chemical product(s) of the fuel cell reaction. More specifically, the cathode catalyst interacts with the cathode reactant, cations that have passed through the PEM, and electrons which have traveled around the PEM via the external load. When hydrogen and oxygen are used as the anode and cathode reactants, respectively, the cathode catalyst aids in the reaction of oxygen with protons and electrons to form water ($\frac{1}{2}O_2 + 2H^+ + 2e^- \rightarrow H_2O$).

In addition to forming chemical products, such as water, the fuel cell reaction also produces heat. Thus, a fuel cell may also include one or more coolant flow field plates disposed adjacent to the anode flow field plate and/or the cathode flow field plate. Such coolant flow field plates typically have an inlet, an outlet and channels that provide fluid communication between the inlet and outlet. A coolant enters the coolant flow field plate at the inlet and flows through the channels towards the outlet, where it exits the coolant flow field. As the coolant flows through the channels of the coolant flow field plate, it absorbs heat produced within the fuel cell and, upon exiting the fuel cell, removes such heat from the fuel cell.

To increase electrical output voltage, fuel cells are typically arranged in series to form a fuel cell stack. In such arrangements, one side of a flow field plate may function as the anode flow field plate for one fuel cell within the stack, while the opposite side of the same flow field plate serves as the cathode flow field plate for an adjacent fuel cell within the stack (i.e., a bipolar plate). The stack may also include other plates such as, for example, anode and/or cathode coolant flow field plates, as well various bus plates, end plate hardware, and other components that are well known in this field.

During operation, a fuel cell stack is susceptible to loss of heat to the environment (e.g., conductive heat loss through attached hardware), particularly at the ends of the fuel cell stack. This loss of heat results in the temperature of the fuel cell stack being non-uniform along its length, with the ends of the fuel cell stack not being maintained at a desired operating temperature. For example, the temperature of the end cells of the fuel cell stack can be relatively lower than the temperature of the remainder of the cells in the fuel cell stack. As relatively hot reactant(s) or products containing water pass through the inlets and outlets extending through the end plate to enter the fuel cell stack, and experience a temperature drop, water from the reactant(s) or products may condense in colder areas in the fuel cell stack. For example, hydrogen coming from a reformer can be relatively hot and saturated with water, such saturation being desirable in order to prevent drying out of the solid polymer electrolyte in the fuel cell stack. In some situations, water may be added to the reactant(s) in a separate step (e.g., pre-humidification) for this same purpose. As this hot, water-saturated hydrogen enters the fuel cell stack, water may condense in the relatively cooler cells at the end of the fuel cell stack.

Condensation of water within the fuel cells at the end of the fuel cell stack is problematic since water can block, for example, the flow channels and flood the fuel cell. Such flooding decreases voltage of the affected fuel cell(s), and overall performance of the fuel cell stack decreases. In addition, flooding may also result in a partial or complete fuel starvation condition which in turn leads to corrosion of one or both electrodes in the affected fuel cell(s).

Prior attempts to solve this problem have primarily involved the incorporation of an electric heater into the fuel cell stack. For example, published Japanese Patent Publication No. 8-167424 discloses a resistive heating element connected in series to, and located between, the fuel cell and the adjacent collecting electrode plate at the end of a fuel cell stack. Current from the fuel cell stack is directed through the resistive heater, which results in increased heating of the fuel cell at the end of the fuel cell stack in response to increased current output from the fuel cell stack. Thus, heating is greatest under conditions of high current output from the fuel cell stack.

Similarly, U.S. Publication No. US 2001/0036568 A1 is directed to a fuel cell stack assembly having a heating element (e.g., a resistive heater) that heats the end plate of the fuel cell stack. A temperature sensor detects the temperature of the fuel cell at the end of the fuel cell stack and sends a signal to a controller which, in turn, controls the power source that supplies power to the resistive heater. At some predetermined temperature, the controller senses that the temperature of the fuel cell at the end of the fuel cell stack is too low and sends an appropriate signal to the power source, thus turning on the resistive heater. This patent publication also discloses the use of a single or multiple sensors interfaced to detect one or more operating parameters of the fuel cell system. All such detected parameters are then inputted to the controller, which can then control appropriate heating of the fuel cell stack.

While advances have been made in this field, there remains a need for improved fuel cell systems generally, including systems and methods for heating or maintaining the temperature of fuel cell(s) within a fuel cell stack. The present invention fulfills these and/or other needs, and provides further related advantages.

SUMMARY OF THE INVENTION

In brief, systems and methods are provided for heating an end cell or cells within a fuel cell stack that are at a lower temperature than other fuel cells in the fuel cell stack.

In one embodiment, a fuel cell system is provided that comprises a fuel cell stack and a resistive heatable element connected in parallel to the fuel cell stack, wherein the resistive heatable element is adapted to heat an end cell of the fuel cell stack. Since the resistive heatable element is connected in parallel to the fuel cell stack, heating will increase as the voltage of the fuel cell stack increases and as the electrical load on the fuel cell stack decreases. In this way, heating of the end cell will be at a maximum under conditions of low electrical loads on the fuel cell stack, which, it has been discovered, is when such heating may be necessary to reduce degradation of the end cell due to heat loss and non-uniform temperature distribution.

In a further embodiment, a method for heating an end cell in a fuel cell stack is provided. The method comprises operating a fuel cell system comprising the fuel cell stack and a resistive heatable element, adapted to heat the end cell of the fuel cell stack, connected in parallel to the fuel cell stack, whereby the heat output of the resistive heatable element increases as the voltage of the fuel cell stack increases and decreases as the voltage of the fuel cell stack decreases.

During the operation of such a fuel cell system, current from the fuel cell stack is automatically directed through the resistive heatable element. In this way, it is not necessary to use external temperature regulation systems comprising components such as sensors, controllers, power supplies and electric heaters to heat the end cell. Accordingly, in certain embodiments, the temperature of the end cell is not regulated by an external temperature regulation system. Furthermore, directing current through the resistive heatable element at low loads, in particular at loads approaching zero, results in a flattening out of the voltage of the fuel cell stack in applications where variable voltage supply is a problem. Additionally, the resistive heatable element acts as a bleed down resistor while shutting down the fuel cell stack (i.e., it draws a small amount of current and, in this way, "bleeds" or consumes excess hydrogen remaining in the fuel cell stack).

These and other aspects of the invention will be apparent upon reference to the attached figures and following detailed description.

DETAILED DESCRIPTION OF PREFERRED EMBODIMENTS

In the following description, certain specific details are set forth in order to provide a thorough understanding of various embodiments of the invention. However, one skilled in the art will understand that the invention may be practiced without these details. In other instances, well known structures associated with fuel cells stacks, such as end plates, bus plates and supply manifolds, sensors, power generation control systems, and fuel cell systems have not been described in detail to avoid unnecessarily obscuring the descriptions of the embodiments of the invention. Unless the context requires otherwise, throughout the specification and claims which follow, the word "comprise" and variations thereof, such as "comprises" and "comprising" are to be construed in an open, inclusive sense, that is as "including but not limited to". Further, in various portions of this description, background information is provided for purposes of clarity. However, there is no intent to be bound by any theory set forth.

The present system and method provide for the heating of an end cell or cells within a fuel cell stack that are at a lower temperature than other fuel cells in the fuel cell stack.

Figure 1:
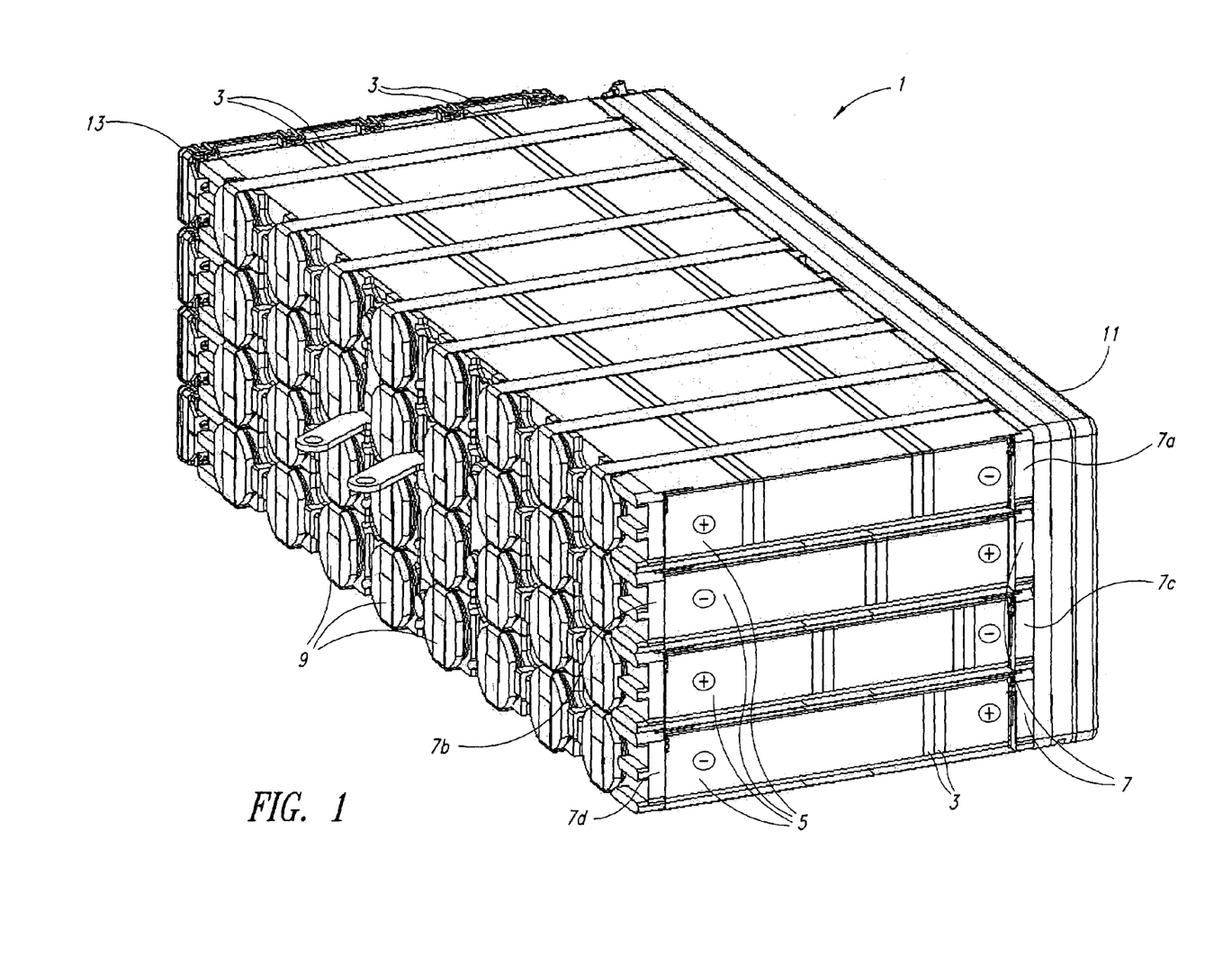
FIG. 1 shows a representative fuel cell stack.

FIG. 1 shows a representative fuel cell stack. As shown in FIG. 1, fuel cell stack 1 comprises a plurality of fuel cells 3. Each individual fuel cell 3 comprises an anode flow field plate (not specifically shown) and a cathode flow field plate (not specifically shown), separated by an MEA (not specifically shown). Fuel flow field channels (not specifically shown) and oxidant flow field channels (not specifically shown) supply fuel and oxidant, respectively, to each MEA. As shown in FIG. 1, fuel cells 3 are arranged in series, such that one side of a flow field plate may function as the anode flow field plate for one fuel cell 3 within fuel cell stack 1, while the opposite side of the same flow field plate may serve as the cathode flow field plate for an adjacent fuel cell 3. Furthermore, as shown in FIG. 1, fuel cells 3 are arranged into a plurality of fuel cell rows 5 within fuel cell stack 1, such that the polarity of fuel cell rows 5 alternate with each individual row (as indicated in FIG. 1).

As shown in FIG. 1, fuel cell stack 1 further comprises a plurality of end plate assemblies 7, each of which comprise an end plate (not specifically shown), an insulating plate (not specifically shown) and a bus plate (not specifically shown). In FIG. 1, spring assemblies and other compression hardware 9 are visible at one end of fuel cell stack 1 while a supply manifold 11 is visible at the other end of fuel cell stack 1. Supply manifold 11 is adapted to direct the flow of reactants to the appropriate flow field channels. Also visible in FIG. 1 is a cell voltage monitoring unit 13 which is used to monitor individual cell voltages during operation.

As described previously, during operation, fuel cell stack 1 is susceptible to loss of heat to the environment at the ends of each fuel cell row 5, particularly in fuel cells 3 near end plate assemblies 7. This is particularly problematic in fuel cells 3 near end plate assemblies 7a, 7b, 7c, and 7d. In such fuel cells, the cathode side, which is where heat is generated during operation, faces away from the respective end plate assemblies (i.e., the anode side faces toward the respective end plate assemblies). As a result, the anode side of the fuel cells 3 adjacent to end plate assemblies 7a, 7b, 7c and 7d are not provided with the heating that would present if the fuel cells faced the other direction. However, supply manifold 11 tends to act as a thermal insulator in the depicted embodiment and, accordingly, fuel cells 3 near end plate assemblies 7a and 7c, which are adjacent to supply manifold 11, are less susceptible to heat loss than fuel cells 3 near end plate assemblies 7b and 7d, which face out to the environment. In practice therefore, in the embodiment of FIG. 1, fuel cells 3 near end plate assemblies 7b and 7d are typically poor performing, and therefore are more significantly prone to degradation and premature failure than other fuel cells in fuel cell stack 1.

Figure 2:
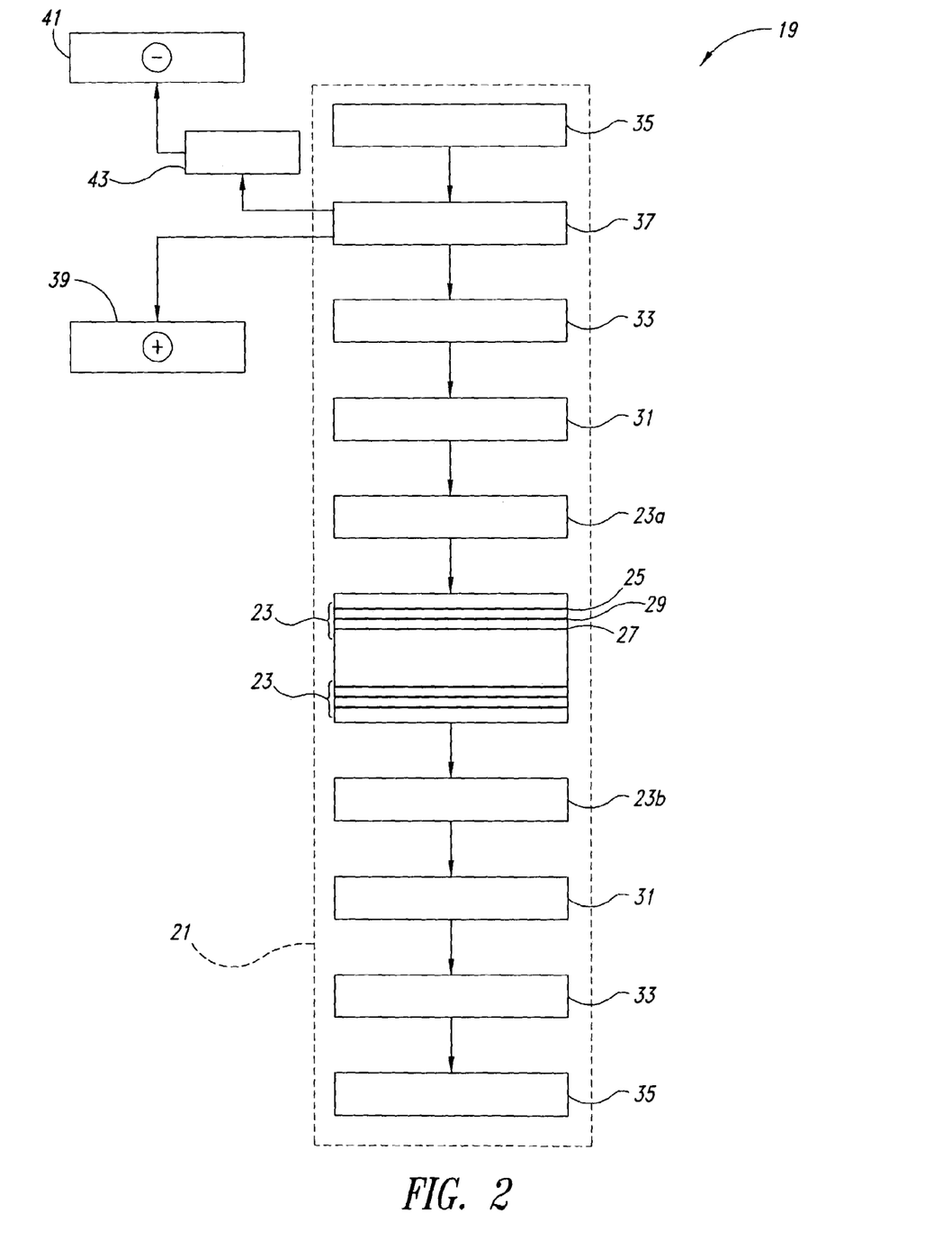
FIG. 2 shows a schematic diagram of a representative fuel cell system comprising a fuel cell stack with a passive end cell heater.

FIG. 2 shows a simplified schematic diagram of a representative fuel cell system for heating a fuel cell stack. As shown in FIG. 2, fuel cell system 19 comprises a fuel cell stack 21, which comprises a plurality of fuel cells 23 arranged in series. Each individual fuel cell 23 comprises an anode flow field plate 25 and a cathode flow field plate 27, separated by an MEA 29. Except for fuel cells 23a and 23b, which are at opposite ends of fuel cell stack 21, the anode and cathode flow field plates in adjacent fuel cells are integrated into unitary bipolar plates. As further shown in FIG. 2, fuel cell stack 21 also comprises a bus plate 31, an insulating plate 33, and an end plate 35 at both ends of fuel cell stack 21. Insulating plate 33 is provided to electrically isolate end plate 35 and compression hardware (not shown) from fuel cell stack 21. For purposes of illustration, fuel cell stack 21 is represented in FIG. 2 by a single fuel cell row, however, it is understood that fuel cell stack 21 may comprise a plurality of fuel cell rows, similar to fuel cell stack 1 illustrated in FIG. 1.

As shown in FIG. 2, fuel cell system 19 further comprises a resistive heatable element 37 arranged between the insulating plate 33 and end plate 35 at one end of fuel cell stack 21. Resistive heatable element 37 is adapted to heat one or more end fuel cells 23a and 23b in fuel cell system 19. Furthermore, resistive heatable element 37 may be configured to have variable resistance zones, and, in this way, have variable heat output along its length. In this way, temperature gradients along end fuel cells 23a and 23b can be better compensated for. Variable resistance zones may be created by varying the cross-sectional dimensions of resistive heatable element 37 appropriately with length. In FIG. 2, resistive heatable element 37 is rectangular and is proportional in size to insulating plate 33 and end plate 35, however, the shape and size of resistive heatable element 37 is not essential to the present system and method, and persons of ordinary skill in the art can readily choose a resistive heatable element 37 suitable for a given application. Similarly, although a film heater (i.e., a thin strip made of resistive material) would be a suitable resistive heatable element 37 for use in fuel cell system 19, the type of resistive heatable element 37 is not essential to the present system and method.

In the embodiment shown in FIG. 2, resistive heatable element 37 is arranged between the insulating plate 33 and end plate 35 adjacent to end fuel cell 23a, which has an anode side that faces out towards the environment. In this way, resistive heatable element 37 may be utilized to heat an end fuel cell, such as end fuel cell 23a, which is most susceptible to loss of heat to the environment. Similarly, in an embodiment in which fuel cell stack 21 comprises a plurality of fuel cell rows such as is shown in FIG. 1, one or more resistive heatable elements 37 may be arranged between the insulating plates and end plates of end plate assemblies 7b and 7d.

As further shown in FIG. 2, resistive heatable element 37 is electrically connected in parallel to, and between cathode terminal 39 and anode terminal 41 of, fuel cell stack 21. The resulting parallel circuit may further comprise a fuse 43 to protect fuel cell stack 21 in the event of a short circuit or heater failure. In an embodiment in which fuel cell stack 21 comprises a plurality of fuel cell rows, resistive heatable element 37 may be connected between the cathode terminal of one cell row and the anode terminal of a different cell row.

Figure 3:
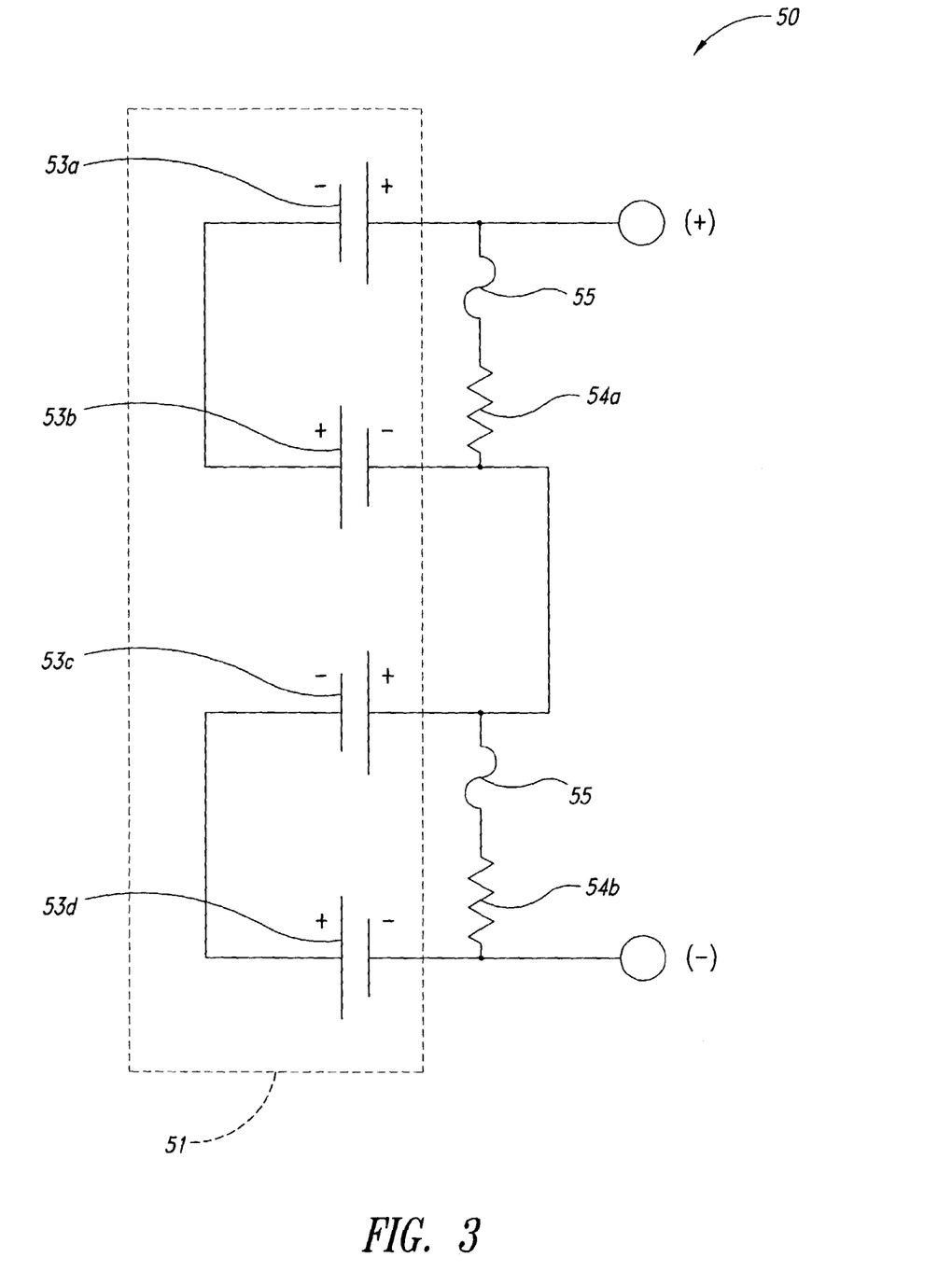
FIG. 3 shows a schematic diagram further illustrating the electrical configuration of a representative fuel cell system comprising a fuel cell stack with a passive end cell heater.

FIG. 3 shows a schematic diagram further illustrating the electrical configuration of a representative fuel cell system comprising passive end cell heaters that are suitable for heating the problematic fuel cells near end plate assemblies 7b and 7d in the fuel cell stack depicted in FIG. 1. The fuel cell system 50 comprising passive end cell heaters illustrated in FIG. 3 is similar to the embodiment described above in which fuel cell stack 21 of FIG. 2 comprises a plurality of fuel cell rows. As shown in FIG. 3, fuel cell system 50 comprises a fuel cell stack 51, which comprises four fuel cell rows 53a, 53b, 53c and 53d. Each fuel cell row comprises a plurality of fuel cell assemblies (not specifically shown) arranged in series. The polarity of fuel cell rows 53a, 53b, 53c and 53d is indicated in FIG. 3. Although not specifically illustrated, it is understood that fuel cell stack 51 further comprises a plurality of end plate assemblies, each of which comprise an end plate, an insulating plate and a bus plate.

As shown in FIG. 3, fuel cell system 50 further comprises two resistive heatable elements 54a and 54b electrically connected in parallel to fuel cell stack 51. Resistive heatable element 54a is connected between the cathode terminal of fuel cell row 53a and the anode terminal of fuel cell row 53b. Similarly, resistive heatable element 54b is connected between the cathode terminal of fuel cell row 53c and the anode terminal of fuel cell row 53d. Each resulting parallel circuit further comprises a fuse 55 to protect fuel cell stack 51 in the event of a short circuit or heater failure.

Although not specifically illustrated, it is understood that resistive heatable elements 54a and 54b may be arranged between the insulating plates and end plates of fuel cell rows 53b and 53d, both of which have a cathode flow field plate (not specifically shown) facing away from corresponding end plate assemblies. As described above, these fuel cell assemblies are most susceptible to loss of heat to the environment.

During operation of fuel cell system 50, current from fuel cell stack 51 is automatically directed through resistive heatable elements 54a and 54b. In this way, it is not necessary to use external temperature regulation systems comprising components such as sensors, controllers, power supplies and electric heaters to heat an end cell or cells within fuel cell stack 51. Accordingly, the embodiments of the present system shown in FIGS. 2 and 3 do not comprise such external temperature regulation systems. Furthermore, since resistive heatable elements 54a and 54b are connected in parallel to fuel cell stack 51, heating will increase as the voltage of fuel cell stack 51 increases and as the electrical load on fuel cell stack 51 decreases. Accordingly, operation of fuel cell system 50 results in increased heating of the fuel cells at the end of fuel cell stack 51 as the voltage of fuel cell stack 51 increases and as the electrical load on fuel cell stack 51 decreases. In this way, heating is greatest under conditions of low loads, which, as shown below, is when such heating may be needed most and when instability of individual fuel cell assemblies, due to heat loss and non-uniform temperature distribution, is most likely to occur.

The following examples have been included to illustrate different embodiments and aspects of the invention but these should not be construed as limiting in any way.

EXAMPLES

In all cases, measurements were made using either a Mark 902 PEM fuel cell power module similar to that shown in FIG. 1 or a cell row (with the anode side facing outwards at the free end) from such a power module. The Mark 902 fuel cell power module has a fuel cell stack comprising four fuel cell rows, each row comprising 110 individual fuel cells. The Mark 902 power module was operated nominally at 80° C. with the surrounding environment at room temperature (about 20° C.) and was supplied with humidified hydrogen gas and air as the reactants.

Example 1

Figure 4:
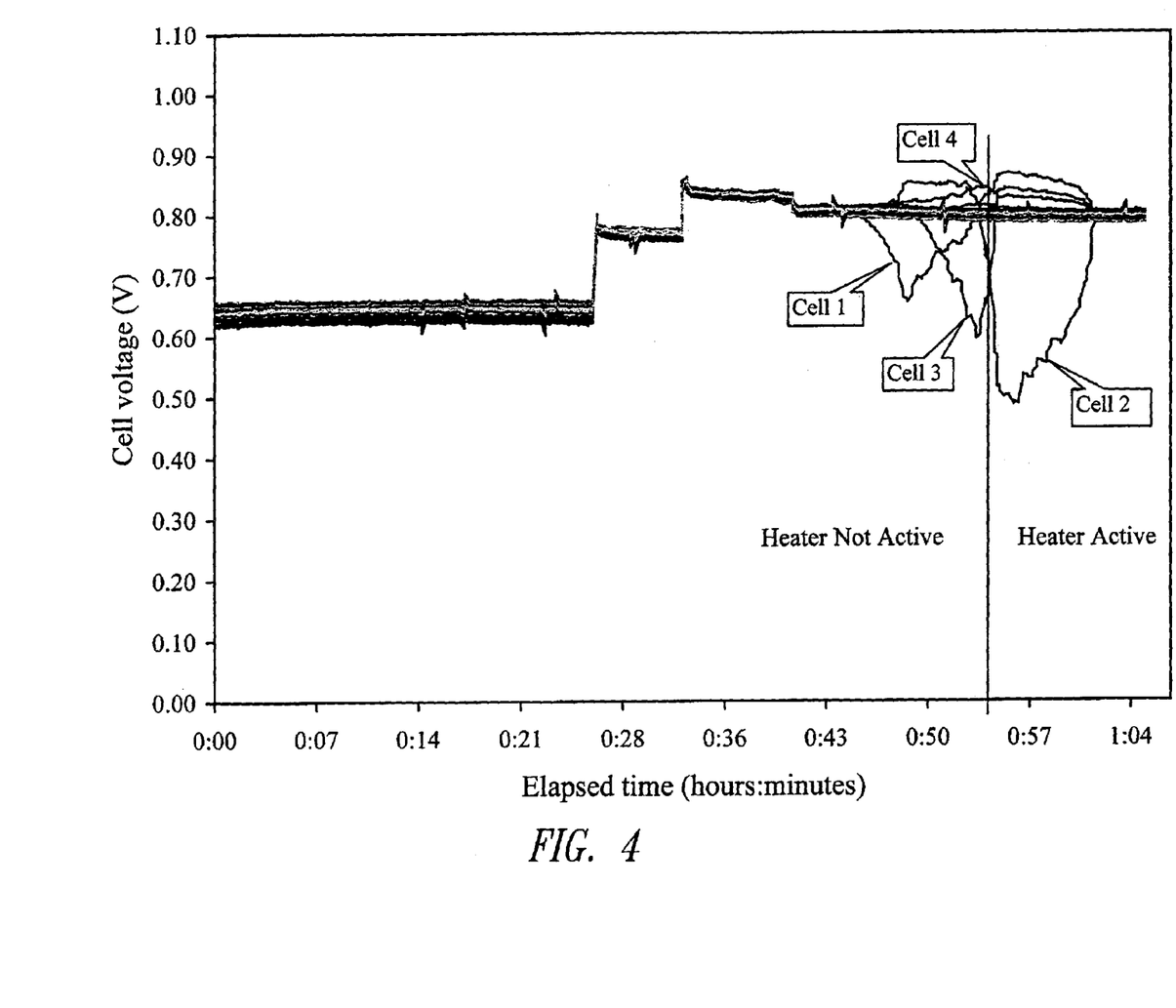
FIG. 4 is a graph showing the effect of a variable load on cell voltage over time for certain end cells of a representative fuel cell stack.

FIG. 4 is a graph showing the effect of a variable load on cell voltage over time for certain end cells of a representative fuel cell stack. More specifically, FIG. 4 shows a plot of cell voltage versus time for each of the 33 fuel cells nearest the end of the first fuel cell row in the Mark 902 power module.

As shown in FIG. 4, from 0 to about 25 minutes, the stack was operated at a load of 300 A and the voltage scans were relatively stable. The load was then reduced twice and increased again to 30 A at about 40 minutes, whereupon the first four end cell voltages became noticeably unstable. A manually controlled end cell heater was activated at about 55 minutes, while the load was still 30 A, and the heater was adjusted such that the temperature of the end cell best matched the temperature of the cells in the middle of the stack. As shown in FIG. 4, shortly after activation of the heater (i.e., at approximately 60 minutes), the voltage scans again became stable.

Accordingly, FIG. 4 demonstrates that additional conventional heating is both necessary and effective at low loads (i.e., 30 A), whereas such heating is not required at high loads (i.e., 300 A).

Example 2

Figure 5:
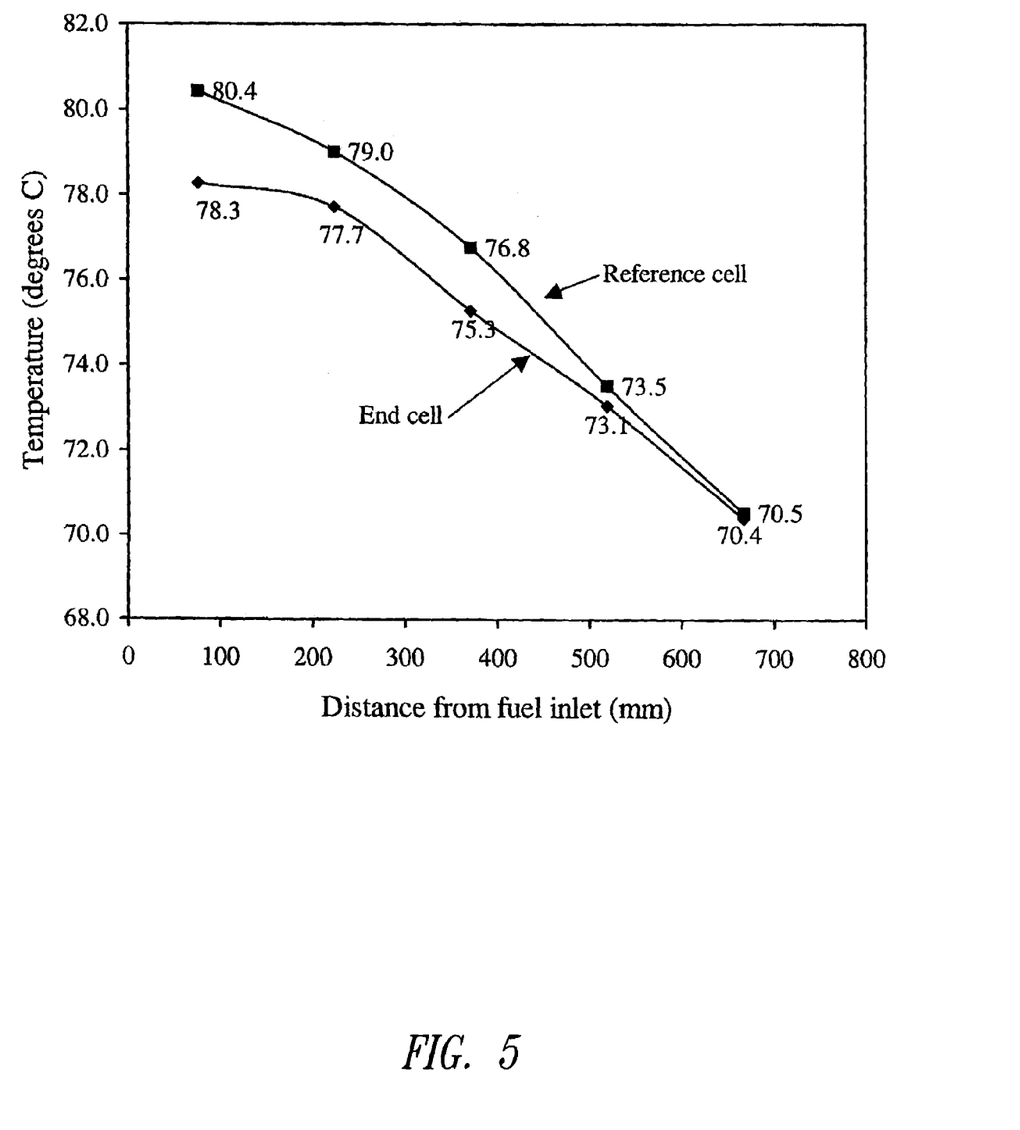
FIG. 5 is a graph comparing the temperature distribution along the length of an anode end cell to that of a reference cell in a representative fuel cell stack at a load of 300 A.

FIG. 5 is a graph comparing the temperature distribution along the length of an anode end cell to that of a reference cell in a representative fuel cell stack at a load of 300 A. More specifically, FIG. 5 shows plots of temperature versus the distance (in mm) from the fuel inlet for both an anode end cell and a reference cell (i.e., a cell located in the middle of the stack) in the Mark 902 power module at a load of 300 A.

As shown in FIG. 5, both the anode end cell and the reference cell experienced a similar decrease in temperature along their lengths during operation of the stack at a load of 300 A. As described in Example 1, under these conditions, the voltages of such cells are stable.

Figure 6:
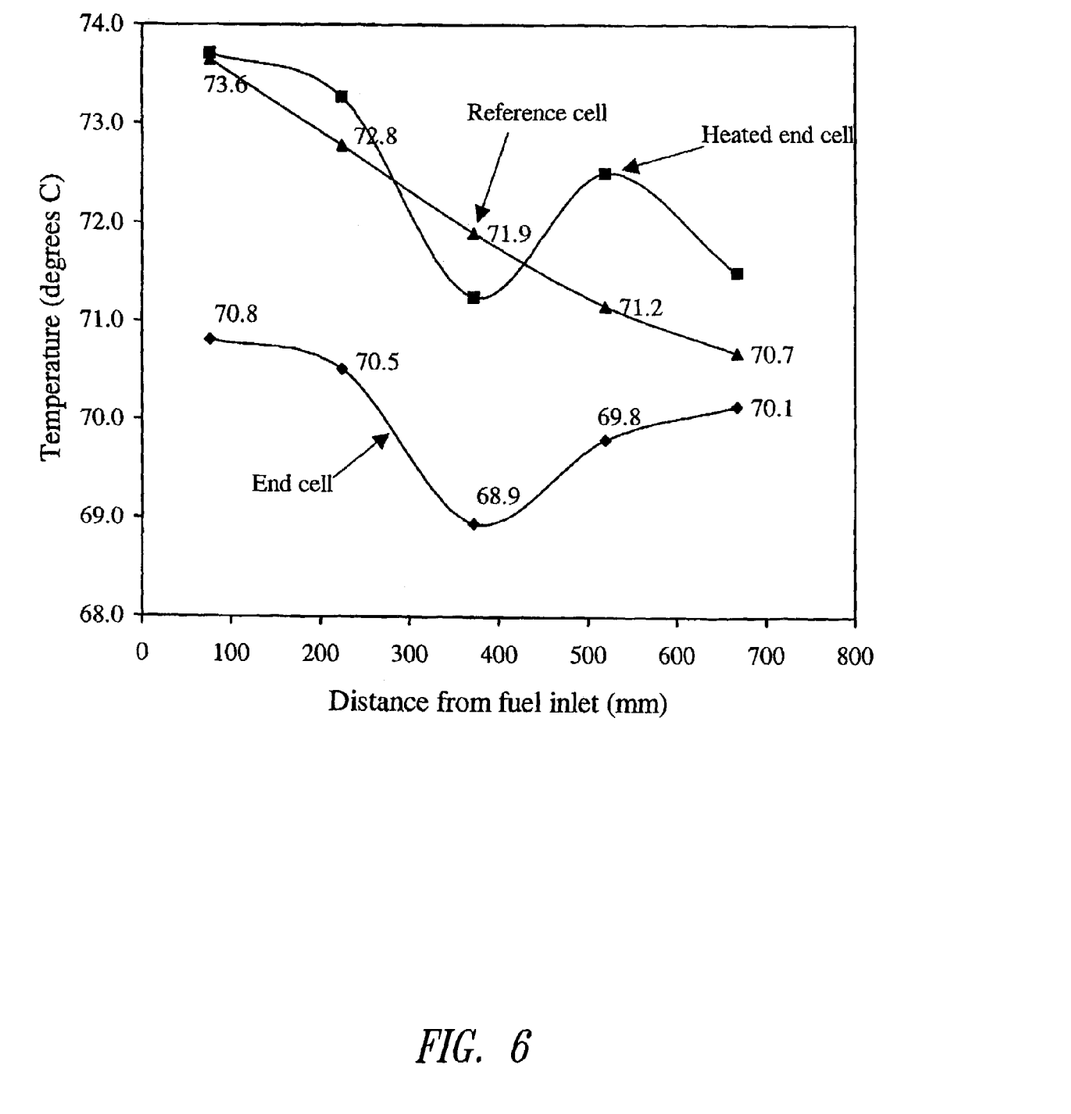
FIG. 6 is a graph comparing the temperature distribution along the length of an anode end cell to that of a reference cell in a representative fuel cell stack at a load of 30 A.

Similar to FIG. 5, FIG. 6 is a graph comparing the temperature distribution along the length of an anode end cell to that of a reference cell in a representative fuel cell stack at a load of 30 A. More specifically, FIG. 6 shows plots of temperature versus the distance (in mm) from the fuel inlet for both an anode end cell and a reference cell (i.e., a cell located in the middle of the stack) in the Mark 902 power module at a load of 30 A.

As shown in FIG. 6, both the temperature and the temperature variation along the length of both cells are much reduced when compared with FIG. 5 (i.e., less than 2° C. variation for the anode end cell) during operation of the stack at a load of 30 A. As described in Example 1, the voltage of the anode end cell is unstable under these conditions. Furthermore, as shown in FIG. 6, there is a dip in the temperature of the anode end cell at about the halfway point. This dip is due to the presence of an electrical bus post and results in uneven current distribution and additional water condensation problems within the anode end cell during operation at low loads.

FIG. 6 also show a plot of the temperature distribution of the anode end cell when a manually controlled, two zone, end cell heater was utilized in which each zone was independently controlled to adjust the temperature of the end cell to best match the temperature of the reference cell. As shown in FIG. 6, the use of additional conventional heating reduced the difference in temperature between the anode end cell and the reference cell.

FIGS. 5 and 6 provide quantitative information about temperature profiles leading to acceptable performance and unacceptable performance in this particular stack.

Example 3

Figure 7:
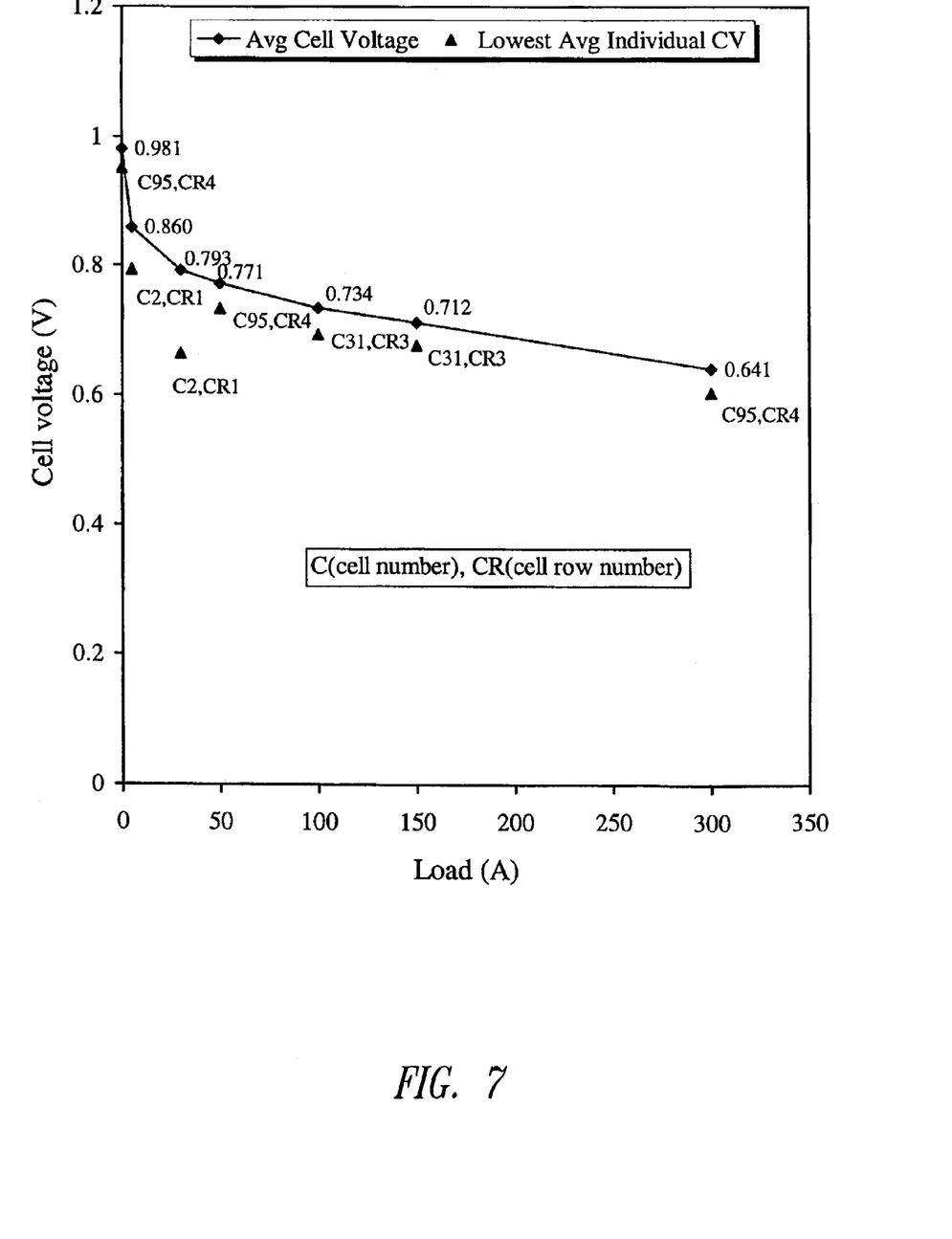
FIG. 7 is a graph showing the effect of a variable load on the average cell voltage and the lowest individual cell voltage for a representative fuel cell stack.

FIG. 7 is a graph showing the effect of a variable load on the average cell voltage and the lowest individual cell voltage for a representative fuel cell stack. More specifically, FIG. 7 shows a plot of the average cell voltage versus load for all 440 cells in the Mark 902 power module and the lowest individual cell voltages (identified by cell and cell row number) for a number of operating loads. As shown in FIG. 7, at or below loads of 30 A, the lowest individual cell voltage was markedly lower than the average cell voltage and typically occurred in, or near, an anode end cell.

Figure 8:
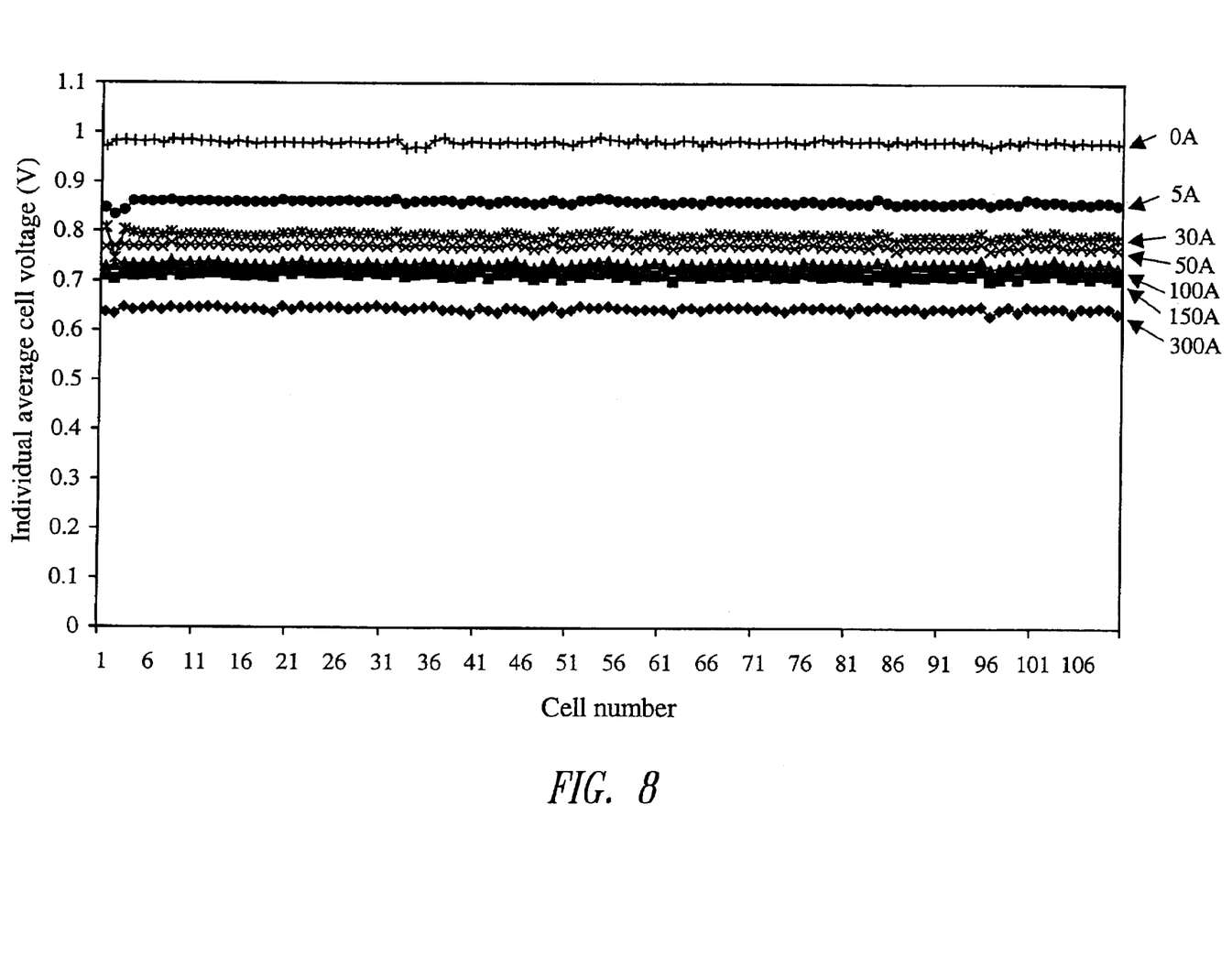
FIG. 8 is a graph showing the effect of a variable load on the individual cell voltages for certain cells of a representative fuel cell stack.

FIG. 8 is a graph showing the effect of a variable load on the individual cell voltages for certain cells of a representative fuel cell stack. More specifically, FIG. 8 shows the individual cell voltages for each of the 110 cells in the first fuel cell row in the Mark 902 power module at operating loads of 300 A, 150 A, 100 A, 50 A, 30 A, 5 A and 0 A. As shown in FIG. 8, the voltage of the cells near the end of the first fuel cell row are undesirably low in comparison to the remaining cells at low operating loads (i.e., at or below 30 A).

Figure 9:
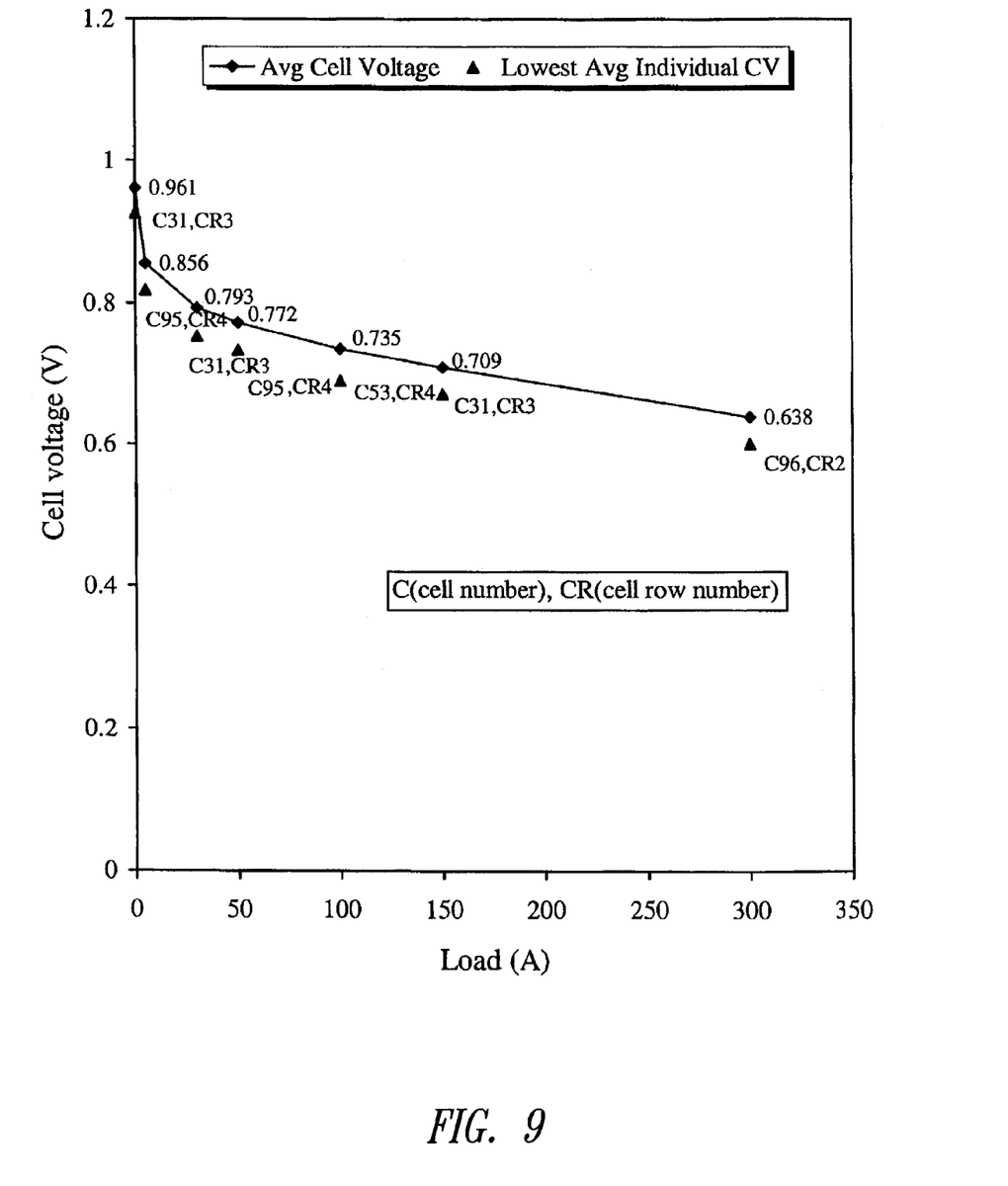
FIG. 9 is a graph showing the effect of a variable load on the average cell voltage and the lowest individual cell voltage for a representative fuel cell stack employing the system and method of the present invention.

FIG. 9 is a graph showing the effect of a variable load on the average cell voltage and the lowest individual cell voltage for a representative fuel cell stack employing the system and method for heating the fuel cell stack of the present invention. More specifically, FIG. 9 shows a plot of the average cell voltage versus load for all 440 cells in a Mark 902 power module employing etched-foil Kapton film heaters connected in parallel across the fuel cell rows, as shown in FIG. 3, and the lowest individual cell voltage (identified by cell number, C, and cell row number, CR) in the same system for a number of operating loads. As shown in FIG. 9, with the use of film heaters, the lowest individual cell voltages at or below loads of 30 A were within the statistical spread seen at higher loads. Furthermore, the lowest cell voltages were no longer clustered near an anode end cell.

Figure 10:
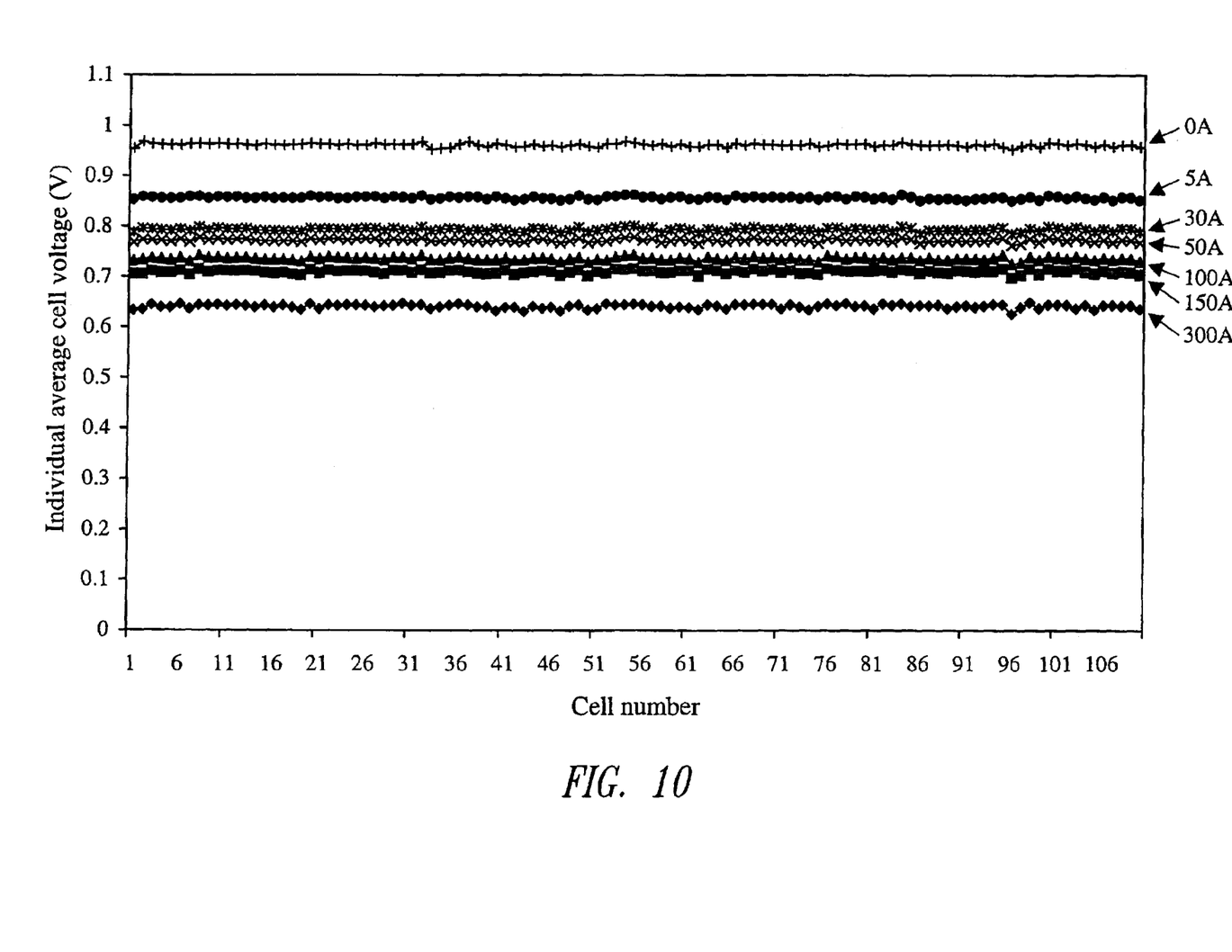
FIG. 10 is a graph showing the effect of a variable load on the individual cell voltages for certain cells of a representative fuel cell stack employing the system and method of the present invention.

FIG. 10 is a graph showing the effect of a variable load on the individual cell voltages for certain cells of a representative fuel cell stack employing the system and method for heating the fuel cell stack of the present invention. More specifically, FIG. 10 shows the individual cell voltages for each of the 110 cells in the first fuel cell row of the Mark 902 power module employing an etched-foil Kapton film heater at operating loads of 30 A, 150 A, 100 A, 50 A, 30 A, 5 A and 0 A. As shown in FIG. 10, with the use of a film heater, the voltages of all the cells fall within an acceptable range.

For purposes of comparison, the following Table 1 compares the power consumption of the conventional two, zone manually controlled end cell heater employed in Example 2 above with that of the passive inventive film heaters of the instant Example 3.

TABLE 1

| Load (A) | Conventional, manually controlled heater, zone 1 near the fuel inlet (W) | Conventional, manually controlled heater, zone 2 near the fuel outlet (W) | Conventional, manually controlled heater, total watts | Passive inventive heater |
|---|---|---|---|---|
| 300 | 24 | 0 | 24 | 23 |
| 150 | 24 | 15 | 39 | 28 |
| 100 | 22 | 24 | 46 | 30 |
| 50 | 20 | 34 | 54 | 35 |
| 30 | 24 | 29 | 53 | 39 |

As shown in Table 1, the power required to have the end cell temperature best match that of the other cells (illustrated by the conventional heater power) increases as the load decreases. The passive inventive heater power consumption closely matches that of the controlled conventional heater and is always adequate but not excessive over the entire load range to appropriately heat the end cells.

Accordingly, FIGS. 7 through 10 demonstrate that the system and method for heating a fuel cell stack of the present invention are effective over a range of operating loads.

While particular elements, embodiments and applications of the present method and apparatus have been shown and described herein for purposes of illustration, various modifications may be made without deviating from the spirit and scope of the invention. Accordingly, the invention is not limited except as by the appended claims.

I claim:

1. A fuel cell system, comprising a fuel cell stack and a resistive heatable element electrically connected in parallel to the fuel cell stack, wherein the resistive heatable element is in thermal contact with an end cell of the fuel cell stack, wherein heat output of the resistive heatable element increases as voltage of the fuel cell stack increases and decreases as voltage of the fuel cell stack decreases, and wherein temperature of the end cell is not regulated by an external temperature regulation system.

2. The fuel cell system of claim 1, further comprising an end plate associated with the end cell of the fuel cell stack, wherein the resistive heatable element is located between the end plate and the end cell of the fuel cell stack.

3. The fuel cell system of claim 2 wherein the resistive heatable element is a film heater.

4. The fuel cell system of claim 3 wherein the film heater comprises variable resistance zones over the length of the film heater.

5. The fuel cell system of claim 1 wherein the fuel cell stack is a solid polymer electrolyte fuel cell stack.

6. The fuel cell system of claim 1 wherein an anode side of the end cell faces away from the fuel cell stack.

7. A fuel cell system, comprising a fuel cell stack and a passive end cell heater, the passive end cell heater comprising a resistive heatable element electrically connected in parallel to the fuel cell stack, wherein the resistive heatable element is in thermal contact with an end cell of the fuel cell stack, and wherein heat output of the resistive heatable element increases as voltage of the fuel cell stack increases and decreases as voltage of the fuel cell stack decreases.

8. The fuel cell system of claim 7, further comprising an end plate associated with the end cell of the fuel cell stack, wherein the resistive heatable element is located between the end plate and the end cell of the fuel cell stack.

9. The fuel cell system of claim 8 wherein the resistive heatable element is a film heater.

10. The fuel cell system of claim 9 wherein the film heater comprises variable resistance zones over the length of the film heater.

11. The fuel cell system of claim 7 wherein the fuel cell stack is a solid polymer electrolyte fuel cell stack.

12. The fuel cell system of claim 7 wherein an anode side of the end cell faces away from the fuel cell stack.

13. The fuel cell system of claim 7 wherein the temperature of the end cell is not regulated by an external temperature regulation system.

* * * * *